US008112740B2

(12) United States Patent
Meijer et al.

(10) Patent No.: US 8,112,740 B2
(45) Date of Patent: Feb. 7, 2012

(54) CORE OBJECT-ORIENTED TYPE SYSTEM FOR SEMI-STRUCTURED DATA

(75) Inventors: Erik Meijer, Mercer Island, WA (US); Wolfram Schulte, Bellevue, WA (US); Barend H. Venter, Issaquah, WA (US); Chia-Hsun Chen, Redmond, WA (US); Christopher J. Lovett, Woodinville, WA (US); Matthew J. Warren, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 869 days.

(21) Appl. No.: 12/139,693

(22) Filed: Jun. 16, 2008

(65) Prior Publication Data

US 2008/0306617 A1 Dec. 11, 2008

Related U.S. Application Data

(62) Division of application No. 10/396,066, filed on Mar. 25, 2003, now Pat. No. 7,389,498.

(51) Int. Cl.
 *G06F 9/44* (2006.01)
(52) U.S. Cl. ........................................ 717/114; 717/126
(58) Field of Classification Search ........................ None
See application file for complete search history.

(56) References Cited

U.S. PATENT DOCUMENTS

| | | | | |
|---|---|---|---|---|
| 5,675,730 A | * | 10/1997 | Perdue et al. | 714/38.1 |
| 5,875,334 A | * | 2/1999 | Chow et al. | 717/141 |
| 6,513,144 B1 | * | 1/2003 | Kim et al. | 716/106 |
| 6,578,192 B1 | | 6/2003 | Boehme et al. | |
| 6,585,778 B1 | | 7/2003 | Hind et al. | |
| 6,993,744 B2 | * | 1/2006 | Hills | 717/108 |
| 6,993,751 B2 | * | 1/2006 | Bhansali et al. | 717/137 |
| 7,299,449 B2 | * | 11/2007 | Ruellan et al. | 717/116 |
| 7,389,498 B2 | | 6/2008 | Meijer | |
| 2002/0188537 A1 | * | 12/2002 | Leeds et al. | 705/35 |
| 2004/0216086 A1 | | 10/2004 | Bau | |
| 2008/0313609 A1 | | 12/2008 | Meijer | |

OTHER PUBLICATIONS

Yasser Shohoud, "Real World XML Web Services: For VB and VB .NET Developers", Sep. 17, 2002, Addison-Wesley Professional, Excerpt from Ch. 2.*
Harold Abelson, Gerald Jay Sussman, Julie Sussman, "Structure and Interpretation of Computer Programs", 1996, The MIT Press, McGraw-Hill, Second Edition, Accessed online at <http://mitpress.mit.edu/sicp/full-text/sicp/book/book.html>—Node 87.*
W3C.Org. XQuery 1.0: An XML Query Language. W3C Working Draft, May 2, 2003. http://www.w3.org/TR/2003/WD-xquery-20030502/. Last accessed Sep. 18, 2008, 332 pages.

(Continued)

*Primary Examiner* — James D Rutten
(74) *Attorney, Agent, or Firm* — Workman Nydegger

(57) ABSTRACT

A type system employing structural subtyping is disclosed herein. A core type system supports several structural types, such as stream, choice, intersection and sequence. Also part of the core type system is a new invariant type, which denotes values whose dynamic type is the same as its static type, and type restrictions for limiting a range of a base type. Furthermore, a streamlined structural version of delegates, called structural delegates and a validation method thereof are introduce into the type system. To further facilitate type safety, strict statically checked interface casts are introduced.

20 Claims, 9 Drawing Sheets

OTHER PUBLICATIONS

Chinenyanga, et al. An Expressive and Efficient Language for XML Information Retrieval. Journal of the American Society for Information Science and Technology. Jun. 5, 2001. http://citeseerx.ist.psu.edu/viewdoc/summary?doi=10.1.1.16.5438. Last accessed Sep. 18, 2008, 30 pages.

Meijer, et al. XMLambda: A Functional Language for Constructing and Manipulating XML Documents. USENIX Annual Technical Conference, 2000. http://citeseerx.ist.psu.edu/viewdoc/summary?doi=10.1.1.46.8937. Last accessed Sep. 18, 2008, 13 pages.

Leontiev, et al. On Type Systems for Object-Oriented Database Programming Languages. ACM Computing Surveys, vol. 34 No. 4, pp. 409-449, Dec. 2002. http://portal.acm.org/citation.cfm?id=592643. Last accessed Sep. 18, 2008, 41 pages.

Cardelli, et al. On Understanding Types, Data Abstraction, and Polymorphism. Computing Surveys, vol. 17 No. 4, Dec. 1985, pp. 471-522. http://lucacardelli.name/Papers/OnUnderstanding.A4.pdf. Last accessed Sep. 18, 2008, 42 pages.

Buchi, e al. Compound Types for Java. In Proceedings of OOPSLA 1998, ACM Press, pp. 362-373. http://citeseerx.ist.psu.edu/viewdoc/summary?doi=10.1.1.28.4246. Last accessed Sep. 18, 2008, 12 pages.

Suciu. Semistructured Data and XML, AT&T Labs, In Proceeding of International Conference of Data Organzation, 1998. http://citeseerx.ist.psu.edu/viewdoc/summary?doi=10.1.1.33.4061. Last accessed Sep. 18, 2008, 13 pages.

Buneman. Semistructured Data. Army Research Office and National Science Foundation, 1997. http://citeseerx.ist.psu.edu/viewdoc/summary?doi=10.1.1.35.5580. Last accessed Sep. 18, 2008, 5 pages.

Meijer, et al. Technical Overview of the Common Language Runtime, In Proceedings PLDI, 2001. http://research.microsoft.com/~emeijer/Papers/CLR.pdf. Last accessed Sep. 18, 2008, 11 pages.

Hostetter, et al. Curl: A Gentle Slope Language for the Web. World Wide Web Journal, II(2), 1997. http://www.cag.csail.mit.edu/curl/wwwpaper.html. Last accessed Sep. 18, 2008, 18 pages.

Fuchs, et al. "Schema for Object-oriented XML." http://www.w3.org/TR/1998/NOTE-SOX-19980930/. Last accessed Sep. 18, 2008, 61 pages.

Jones, et al. Scripting COM Components in Haskell. In : Proc. of the Fifth International Conference on Software Reuse, Victoria, British Columbia, Jun. 1998. http://citeseerx.ist.psu.edu/viewdoc/summary?doi=10.1.1.1.7197. Last accessed Sep. 18, 2008, 11 pages.

Finne, et al. H/Direct: A Binary Foreign Language Interface for Haskell. In ICFP'98. http://citeseerx.ist.psu.edu/viewdoc/summary?doi=10.1.1.55.2592. Last accessed Sep. 19, 2008, 10 pages.

Sperberg-McQueen, et al. XML Schema, W3C Architecture Domain. Retrieved from the net on Jul. 7, 2005, 18 pages.

Breazu-Tannen, et al. Inheritance As Implicit Coercion. In: Information and Computation, 1991, vol. 93, pp. 172-221. Last accessed Jul. 8, 2005, 47 pages.

Office Action mailed on Jul. 3, 2006 cited in U.S. Appl. No. 10/396,066.

Office Action mailed on Dec. 18, 2006 cited in U.S. Appl. No. 10/396,066.

Office Action mailed on Jul. 13, 2007 cited in U.S. Appl. No. 10/396,066.

Notice of Allowance mailed on Mar. 31, 2008 cited in U.S. Appl. No. 10/396,066.

Eric Gamma et al, "Design Patterns", 1995, 395 pages.

Benjamin C. Pierce et al., "Types and Programming Languages", The MIT Press, Cambridge, MA, 2002.

Tadeusz Pankowski, "XML-SQL: An XML Query Language based on SQL and Path Tables", 2002, 15 pages.

\* cited by examiner

| $T^{ij}$ | ! | ? | + | * |
|---|---|---|---|---|
| ! | ! | ? | + | * |
| ? | ! | ? | + | * |
| + | + | * | + | * |
| * | + | * | + | * |

FIG. 3

| | ! | ? | + | * |
|---|---|---|---|---|
| void | void | void | void | void |
| ! | ! | ? | + | * |
| ? | ? | ? | * | * |
| + | + | * | + | * |
| * | * | * | * | * |

FIG. 4

CORE OBJECT-ORIENTED TYPE SYSTEM FOR SEMI-STRUCTURED DATA

CROSS REFERENCE TO RELATED APPLICATIONS

This application is a divisional of U.S. patent application Ser. No. 10/396,066, filed on Mar. 25, 2003, entitled "A CORE OBJECT-ORIENTED TYPE SYSTEM FOR SEMI-STRUCTURED DATA", the entirety of which is incorporated herein by reference.

TECHNICAL FIELD

The present invention relates generally to computer systems, and more particularly to a language type system.

BACKGROUND

The exponential developments in computer hardware over the past several decades have spawned increasing complexity in computer programs. Computer hardware, specifically computer chips, have held strong to Moore's Law, doubling in computing power every eighteen months. We have gone from room size computers, to small 8-bit computer chips with only a few thousand transistors to the technology of today that includes 64-bit chips packed with almost 50 million transistors. We have moved from a time when 8 bits were a great deal of memory to a time where 256 megabytes of memory and 50 gigabyte storage mediums are common. As the trend continues we will see a continued devotion to the exponential growth of computer hardware including computer chips which will contain billions of nanometer sized transistors and storage mediums capable of holding terabytes of information. Accordingly, computer programs will continue to grow even larger and more complex, than that of today, in order to meet and exceed functional desires and expectations of businesses and consumers. However, increasing programmatic size and complexity has a cost, and that cost can be measured in part as a function of reliability.

Due to the increasingly complex nature of software systems, programmers have been riddled by undetectable programmatic errors that oftentimes do not manifest until too late. Developers continue to try to expand power of programming languages by incorporating complex mathematical and philosophical concepts. Additionally, the software market is becoming increasingly platform independent and service oriented. Combining powerful object-oriented programmatic concepts into the new data centric and service based world causes programmers problems as they try and piece together best parts of a multitude of different technologies in an ad hoc fashion.

Type systems are a formal mechanism for ensuring that typed programs perform correctly and in a well-behaved manner. Typed programs or typed systems are generally programs or systems that assign types to variables (e.g., Boolean, integer, real, etc.) or objects. Types are classifications of data that describe how a programmer wants to use the data and how a compiler should interpret such data. However, many functions are only defined to work on particular types (e.g. integer addition or floating point addition). If a given function is defined to work with a certain data type and it receives a different type of data, a type error will be produced. A type system can prevent certain execution errors by utilizing a type-checking algorithm to determine whether a program is well behaved or ill behaved. This process is referred to as type checking. Type checking allows for early detection and therefore correction of errors that may often go undetected by programmers. If such errors are left uncorrected they may lurk in the code, only to become manifestly obvious at a most inopportune time.

In general there are two varieties of type systems—nominal and structural. A nominal type system is a system in which type names are used to determine whether types are equivalent. In a structural type system, names are not essential, because types are said to be equivalent if they have the same structure, as the name suggests. For example assume Type A=string of integers (1 ... 10) and Type B=string of integers (1 ... 10). Further assume that a is of Type A, b is of Type B, and the expression a=b is written into the same program. Under a nominal type system this expression would produce an error because a and b are of different types. Under a structural type system such an assignment would be legal because the types are equivalent.

However, conventionally, standard underlying runtime environments that provide program execution (e.g., JVM and CLR) employ nominal type equivalence. Thus, support has only been provided for nominal type systems, while structural type systems have been constrained to a topic of academic discussion.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention discloses a type system that extends conventional object-oriented type systems based on nominal subtyping with various constructs that exhibit rich structural subtype relationships. The type system of the present invention and its valuable structural extensions thereby provide for a powerful program error detection system. Structural types allow for very precise annotations. The number of errors that a system can detect has a direct relationship with how precisely the programming language can be described. Therefore, enabling the use of structural types makes a language more precise and less error prone.

The structural types employed herein for example include stream, choice, intersection, sequence, and invariant. Streams are a lazy list of values, which are a strongly-typed refinement on the standard IEnumerable interface. The choice type is a structural type that indicates that an instance may be either type S or type T, whereas intersection is an anonymous type that denotes an instance that has both types S and T. Additionally, a sequence type is a structural type ordered list, and the invariant type is a new type that denotes values whose dynamic type is the same as its static type.

Structural delegates are another language construct that contributes to the present invention. Delegates are widely used structures that enable method encapsulation. Structural delegates are delegates with light weight syntax for function enclosures. Furthermore, the structural delegates of the present invention can be validated using associated structural subtyping rules.

Additionally, type restrictions are supported by the present type system. In many applications, programmers may desire a new type that restricts range of values of some base type to a subset of those values according to some predicate. This functionality is especially important to programmers that deal with data intensive programming tasks who need to specify precise types for objects they manipulate. Therefore, for purposes of added flexibility, various manners for restricting type range are integrated into the type system in accordance with the present invention.

Finally, strict statically checked interface casts are provided to add an additional layer of type safety. Interface-based programming is an important and evolving technique for building flexible, extensible, and version resilient application frameworks. Thus, it is important to have first-rate language and type support for both consuming and producing interface-based libraries. The present invention provides such support and increases the ability of the type checker to detect errors by performing strict statically checked casting to interface types.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 3 is a flattening table in accordance with an aspect of the present invention.

FIG. 4 is a lifting member access table in accordance with an aspect of the present invention.

DETAILED DESCRIPTION

Figure 1:
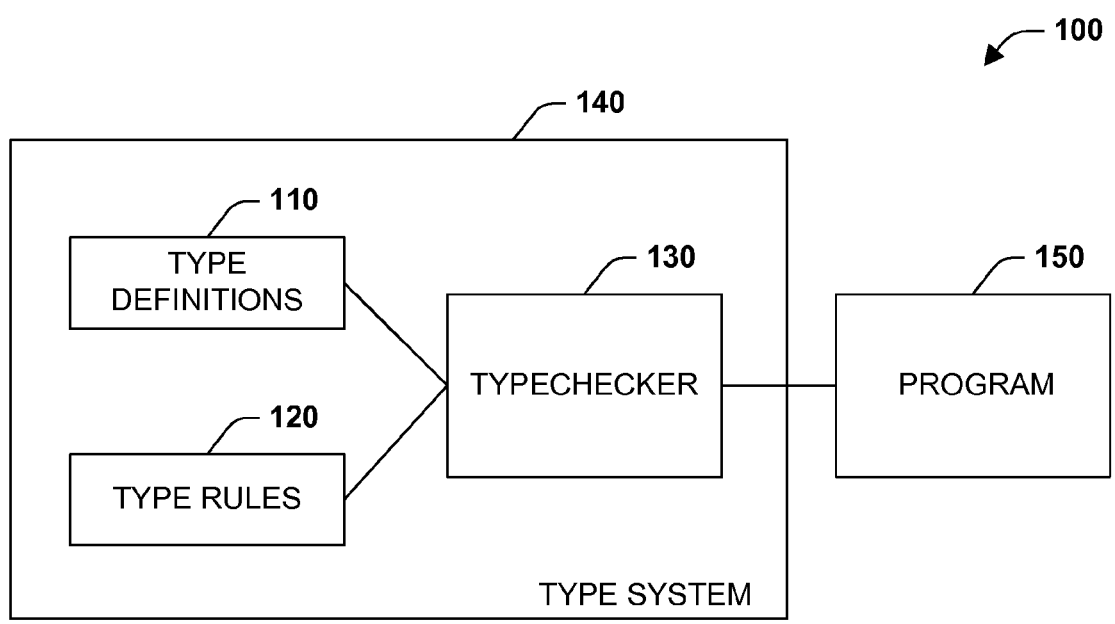
FIG. 1 is a block diagram of an error detection system in accordance with an aspect of the present invention.

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, there is a formal notation that is used throughout this specification. The purpose of the formal notation is to capture semantics of a design at an appropriate level of abstraction so that the semantics can be expressed in a compact form for efficiency in communicating the essence of the invention.

The following table illustrates commonly used abbreviations and there corresponding meanings. Furthermore, it should be noted that when lists are named there is often an s at the end. It is to be appreciated that the formal notation is merely exemplary and should not be construed to limit the scope of the invention as defined by the hereto appended claims.

| | |
|---|---|
| b | Binding |
| e | expression |
| f | a function which can either be a real function or some code inlined by the compiler (for example, boxing/unboxing). |
| m, n | labels (field names) |
| p | predicate (i.e. expressions of type Boolean) |
| T, S | a type (usually in upper case) |
| t, s | an expression of type T or S (lowercase) |
| G | environment |
| x | Variable |

Subtyping relationships are written as $T_1 <: T_2$, which reads that $T_1$ is a subtype of $T_2$ or alternatively that $T_2$ is a supertype of $T_1$. The type system grammar itself employs regular BNF syntax.

Judgments make a statement about a given language expression and its relation to a language type. A proof (or witness) is also provided in the form of another language expression. The types of relationships described by these judgments depend on a particular area of the specification. Examples include judgments about subtyping relations as will be described in detail in a core type system portion of this specification.

$E <: S | T \leadsto e'$

The expression above reads: E is a subtype of the type union S|T and the witness is e'. The following is an example of a judgment about validation of XML literals:

<M>t</M>validates as N$\leadsto$f(')

Inference rules express a logical relation between judgments and describe how complex judgments can be concluded from simpler premise judgments. A logical inference rule is written as a collection of premises and a conclusion, respectively written above and below a dividing line:

$$\frac{\text{premises}_1 \\ \ldots \\ \text{premise}_n}{\text{conclusion}}$$

All premises and the conclusion are judgments. The interpretation of an inference rule is: if all the premise judgments above the line hold, then the conclusion judgment below the line must also hold. For example:

$$\frac{t \text{ validates as } M \leadsto t'\quad M <: N \leadsto f}{<M>t</M> \text{ validates as } N \leadsto f(t')}$$

The inference rule reads: the literal expression <M>t</M>validates as N if M is a subtype of N and if t validates as M.

Logical inference rules use environments to lookup a type of a name used within the rules. For example:

$$G+e<:t$$

which reads: given environment G, e is a subtype of type t. In general, an environment maps names to types as follows:

$$G=\{x_1->t_1, \ldots, x_n->t_n\}$$

This means the environment G maps $x_1$ to $t_1, \ldots$ and $x_n$ to $t_n$ respectively. An operator + is employed to denote functional overriding to add new mappings to the environment:

$$G+q$$

This expression results in all pairs (maplets) in r and q except pairs in r whose first element is also in q. For example:

$$\{x_1->t_1, x_2->t_2\}+\{x_1->t_{11}, x_4->t_{44}\} \{x_1->t_{11}, x_2->t_2, x_4->t_{44}\}$$

I. Core Type System

Turning initially to FIG. 1, a program error detection system 100 is depicted in accordance with an aspect of the present invention. Error detection system 100 includes type definitions 110, type rules 120, type checker 130, type system 140 and program 150. In order to validate a given program 150 several things are initially defined about the program 150. First, the formal types that program 150 will allow are specified in type definitions 110. The present invention includes extensions to conventional object-oriented type systems, therefore in addition to conventional types, type definitions 110 include various structures that exhibit rich structural subtype relationships such as streams. In addition, type rules 120 are specified to declare how types are to be constructed, eliminated, and assigned. After type definitions 110 and type rules 120 are established, they can be employed by type checker 130 to detect errors in program 150. Type definitions 110, type rules 120, and type checker 130 together comprise what is referred to as type-system 140.

As described briefly supra, various type-system related specifications each introduce relations that together define the type-system rules 120. A main typing relation used to describe the core type system is $$G1-e<:T\leadsto e'$$

which reads that expression e has type T given the environment G containing the types for variables occurring in e. Witness expression e' explicitly records all (implicit) operations and overloading resolution steps that are applied to expression e to prove that it indeed has type T. Note that expression e is an unrestricted language expression whereas the witness expression e' is an expression in a subset of the language. It should further be noted that the environment and the witness parts of the express may be left out of descriptions that follow for purposes of intelligibility, if they are clear from the context.

The judgment <: is overloaded to indicate a subtype relation between two types. The subtyping judgment S<: T⤳f denotes that type S is a subtype of type T with an invertible witness function f of signature T f (S) that makes the coercion explicit. As usual, subtyping is transitive and reflexive:

$$\frac{S <: S \leadsto \text{id} \quad S <: T \leadsto f, T <: R \leadsto g}{S <: R \leadsto h}$$

where function h is defined as R h(S s){return g(f(s));}.

The subsumption rule means that one can use an expression of a subtype wherever an expression of the supertype is expected. More formally:

$$\frac{S <: T \leadsto f \quad e <: S \leadsto e'}{e <: T \leadsto f(e')}$$

Furthermore, before delving into the details of various type extensions, the concept of coherence will be discussed. In some conventional languages, a witness of an (up)cast is an identity function, except for boxing (or as the C# language definition indicates "Reference conversions, implicit or explicit, never change the referential identity of the object being converted"). Because of structural type equivalence rules, in an actual implementation of the present type-system 140 there will be many (implicit) conversions that require computation (for instance wrapping/unwrapping of transparent wrappers) and thus changing the representation of an underlying representation of the value. Hence it is important that the type system be coherent, which means that if there are two ways to prove that an expression e has type T, say e<: T⤳e1 and e<: T⤳e2, then e1 and e2 must denote the same value. In particular, if T is a reference type, e1 and e2 must be substantially identical.

Coherence implies that for any of our type constructors C for which there exists an upcast T<: C T⤳f from a reference type T to C T, and another upcast C T<: S⤳g from C T to another reference type S, the composition of the witness functions f and g should be the identity (or boxing) as well. Concrete examples of such type constructors are choice and streams (discussed infra). Choice and stream have several issues with respect to coherence including:

Since for choice we have that S<: S|T and S|T<: R when both S<: R and T<: R; coherence implies that upcasting from S to R directly should be indistinguishable from upcasting from S to S|T and then from S|T to R.

For streams we have that T<: T? and T?<: object, and hence upcasting from T to object should result in the same value as upcasting from T to T? and then from T? to object. (Note that in particular we have that object<: object? and object?<: object).

Another situation in which coherence is endangered for streams is with respect to covariance. Assume values of type int* look like [x,y,z] and values of type int? look like<x>. Upcasting from int* to int*? to int** and upcasting from int* to int?* to int** might result in two different values:

| | |
|---|---|
| [1,2,3] <: int* | [1,2,3] <: int* |
| hence | hence |
| <[1,2,3]> <: int*? | [<1>,<2>,<3>] <: int?* |
| hence | hence |
| [[1,2,3]] <: int** | [[1],[2],[3]] <: int** |

One solution is to make nesting of stream types associative (discussed further infra), which will collapse all nested streams into a single unnested one. In the above example both [[1,2,3]] and [[1][2][3]] collapse to the same value [1,2,3] of type int*.

Finally, throughout the following section, describing several different types employed in the type system, for purposes of clarity and understanding, the typing rules will be defined as concise and readable as possible. For instance, many of the typing rules will be described using " . . . " notation instead of using explicit indices. Furthermore T[m] will often be employed to denote a field of type T with a possible label m. Multiple occurrences of the same [m] must be substituted consistently; hence [S[m], T[m]] is an abbreviation for [S,T] and [m, T m]. Finally, [ . . . , T[m]_i, . . . ] will be used to denote the i-th field in a sequence.

Figure 2:
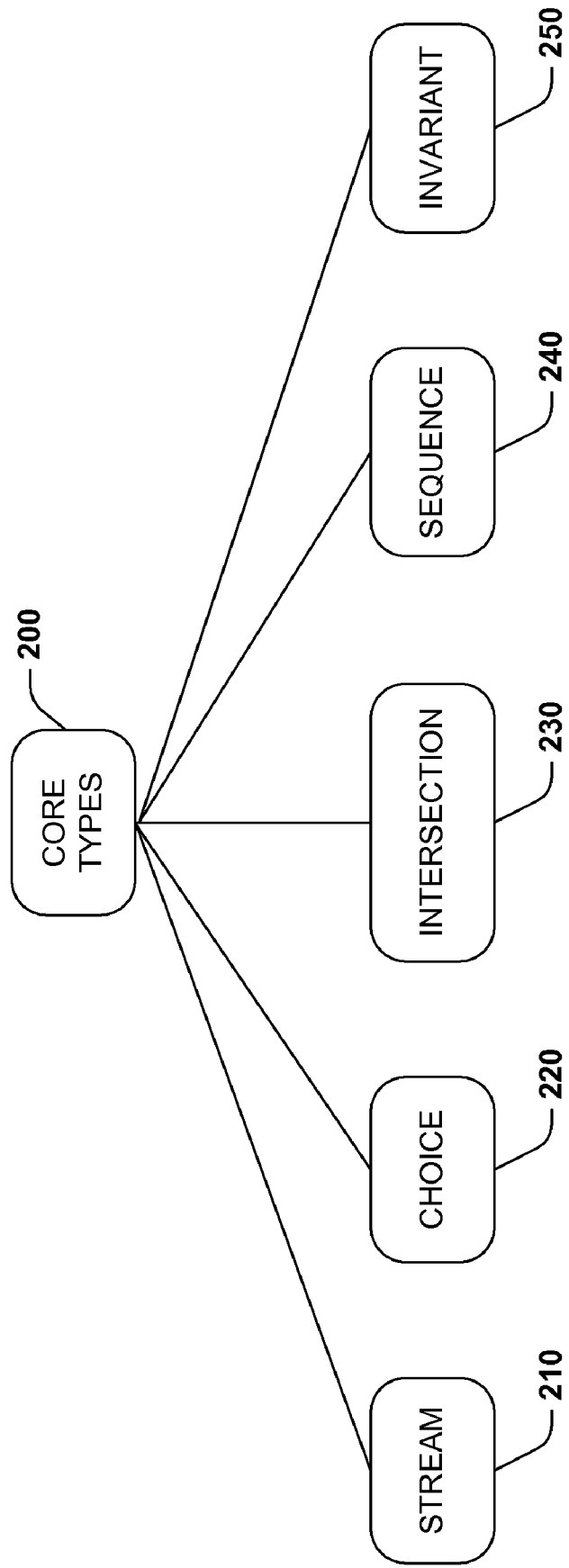
FIG. 2 is a block diagram depicting type system core types in accordance with an aspect of the present invention.

Turning briefly to FIG. 2, a block diagram illustrating the core types 200 supported by the system 100 described in FIG. 1. The core types include stream 210, choice 220, intersection 230, sequence 240, and invariant 250. These types may be defined in the type definitions 110. Furthermore, they form fundamental elements of programming language 150. However, it should be appreciated that the core types 200 are designed to extend traditional object oriented type systems and are not meant in any way to limit, in number or kind, the types that are employed in type system 140. Each type will now be described in detail in the following sections. Included in the discussion will be information about applicable typing rules such as subtyping rules, introduction and elimination rules, lifting rules, etc.

A. Streams

A stream 210, denoted T*, is a lazy list of values of values [t0, t1, . . . ] employing occurrence constraints. The occurrence restraints can be arbitrary or confined to ranges. For example:

T* denotes streams with >=0 elements of type T
T+ denotes streams with >=1 elements of type T
T? denotes streams with =<1 elements of type T
T! denotes streams with ==1 elements of type T 1. Subtyping Rules Associativity: (TIS*)*=(TIS)*
Covariance: T*<: S* provided T<: S
Lifting: T<: T*
IEnumerator: T*<: IEnumerator 2. Introduction Rules There is no need for an explicit constructor for stream types 210 since stream types 210 can be created by (implicitly) upcasting, for example, from T to T? or by (explicitly) downcasting, for example, from T to T!. Additionally, stream types 210 can be created by upcasting from sequence { } or by yielding a result of type T in an iterator statement.

3. Elimination Rules

Elimination of a stream 210 can be accomplished by downcasting from T* to T, or T* to T! if the stream 210 contains at least one element. Upcasting to IEnumerator from T* will also eliminate the stream 210.

4. Lifting Member Access

Member access M on type T returning a result of type R is lifted to member access on type T* returning R* by applying the member access to every element in the stream T*

5. Streams of Restricted Range

As described above occurrence restraints can be applied to streams 210 to better enable a type system to statically deal with streams. The type T* denotes the set of possibly empty streams 210 with elements of type T. A stream 210 of type T* can be empty (e.g., have no elements, for instance MoveNext is always false), it can be finite (e.g., after a finite number of calls MoveNext becomes false), or infinite (e.g., MoveNext will always be true). There are various ways to create values of type T*, but the most powerful way is to use generators. A generator is block that contains one or more yield statements. For example, the closure RepeatSelf(i) generates a stream of i times the number i:

static int* RepeatSelf(int i) {for(int j=0; j<i; j++) yield i;}

The effect of a yield statement in a for loop is that closure "returns" i times the value i. Another way of looking at this is to view RepeatSelf as a factory that returns an IEnumerator of integers that sets the Current property to each subsequently generated integer. Streams of streams are automatically flattened (described infra), that is, types T** and T* are the same. By leveraging on this automatic flattening, an infinite stream of self counting numbers 1, 2, 2, 3, 3, 3, . . . can be defined by simply generating the stream of streams RepeatSelf(i) for all i.

The type T+ denotes a set of non-empty streams 210 with elements of type T. This means that calling MoveNext on a stream 210 of type T+ is invariably guaranteed to succeed at least once. To assign type T+ to an expression e, the typechecker 130 needs to prove that every execution path in e always yields (at least) a non-null value. Hence, the typechecker 130 will accept a first definition of FromTo but not a second:

```
// OK, every execution path yields non-null value
int+ FromThen(int start, int step) {
  yield start; while(true) yield start += step;
}
// Type error, loop might not be executed
int+ FromThen(int start, int step) {
  while(true){ yield start; start += step; }
}
```

There is an implicit conversion from non-empty streams to possibly empty ones; therefore one can forget the fact that a stream has at least one element. But as the next example shows, it is, in general, not safe to downcast from a possibly empty stream to a non-empty stream, because due to side-effects the number of values in a stream can be different each time it is re-enumerated:

```
bool Done = false;
int* OnlyOnce( ) { if(!Done){ Done = true; yield 4711; }};
```

The generator function OnlyOnce( ) only yields 4711 a first time it is pulled, but every subsequent use of OnlyOnce( ) produces an empty stream.

```
int+ xs = (int+)OnlyOnce( );
// Does not print anything :-(
xs.{ Console.WriteLine(x); };
```

To prevent such loopholes, downcasting from T* to T+ will in most cases be made to fail.

Member access on non-empty streams is also lifted from a base element type. However, programmers need to careful in assigning a result type since a resulting stream might become empty even when a receiver stream is non-empty:

```
class Line { Point start; Point end; }
// each non-null Point in drawing has null start and end members
Line+ drawing = ({ yield new Line( ); yield new Line( ); });
Point* s = drawing.start;
```

Types T? and T! are the singleton variants of the possibly unbounded stream types T* and T+ respectively. Often it is convenient to specify whether a single value possibly can, or may never be, null. The type T! denotes streams 210 with exactly one element, which means that values of type T! can never be null (an empty stream). The type T? denotes streams 210 of one (a singleton stream, e.g. a non-null value), or zero elements (an empty stream, e.g. null). Being able to express that a value cannot be null via the type system, allows static checking of many dynamic checks for null pointers and corresponding raising and catching of NullReferenceException, ArgumentException, ArgumentNullException, or perhaps some other user-defined exception that is thrown when an argument is null. For example, a static function static IPAddress Parse(string a) is one of the many methods in the .NET base class library that throws an ArgumentNullException when its argument is null. This means that in the definition of IPAddress.Parse we must have an explicit null check and that all clients of IPAddress.Parse must be prepared to catch an ArgumentNullException. Moreover, since nothing of this contract is apparent in the type of the Parse method, programmers have to rely on documentatio, or in the worst case, on IL (Intermediate Language) code of the method to understand what is happening. If instead the type of IPAddress.Parse indicated that it expects its string argument to be non-null by using string!, things are much cleaner and safer. For instance:

public static IPAddress Parse(string! a);

Now, the type-checker 130 is able to statically reject any attempt to pass a null string to IPAddress.Parse. Non-null types are created by literals and constructors, or by an explicit downcast as explained above.

For reference types T, there is an implicit conversion from T! to T, but an explicit down-cast is required from T to T!. This cast will throw an exception such as NullPointerException when applied to null. Since value types (such as int) are never null, the type T! is equivalent to T when T is a nominal value type.

It is very convenient to be able to express in the type-system that null is an expected value. Normally member access throws an exception when the receiver is null. For example, after the assignment Button b=null; subsequent member access b.AllowDrop will fail. In many cases, we don't care what happens if the receiver is null, but in order to achieve that, we need to write boiler-plate code:

```
if(b!=null){
    ... do something with b ...
} else {
    ... performs some default action ...
}
```

When the receiver has static type T?, member access is lifted just as happens for the other stream types, and does nothing. The possibility of failure is recorded in the return type of the lifted access, which becomes bool? Instead of bool.

```
Button? b = null;
bool? d = b.AllowDrop; // returns null
```

For value types, the type T? provides a transparent strongly typed implementation of the INullable interface. Since we have built-in support for nullable value types, there is no need to use Null for a designated value empty value of type T?, instead we can uniformly use null. For value types, T? does not introduce reference identity, that is, values of type T? are still copied on assignment; the important difference between value types T and T? is that instances of T? can be null whereas instances of type T are never null. There is an implicit conversion from T to T? for any type T, but an explicit downcast is required from T? to T. For reference types this conversion always succeeds. For value types T, this downcast will fail when applied to null and throws a null exception (although, strictly speaking, in this case, null is not a reference).

```
bool e = (bool)d; // will throw
Button c = (Button)b; // succeeds
```

In a number previous examples, nested streams have been flattened and member access is lifted over streams. As shown FIG. 3, a flattening table, when flattening a stream of streams the cardinality of the outer stream determines the cardinality of the resulting stream. For instance, the non-empty stream of possibly empty unbounded streams T*! is equivalent to a single non-empty unbounded stream T+. This rule is used by the type-checker to verify that yielding at least one value of type int generates a non-empty stream:
int+OneTwoThree=({yield 1; yield 2; yield 3;});

The fact that empty streams are eliminated by flattening shows up in the equivalence T*=T!*, which means that all elements in a stream are not null. Hence, when we iterate over the elements of a stream, we can safely assume that none of them is null:

```
Button* bs = new(null, <Button><Text>OK</Text></Button>, null);
// prints once
foreach(Button! b in bs) Console.WriteLine(b.Text);
```

Figures 3, 4:
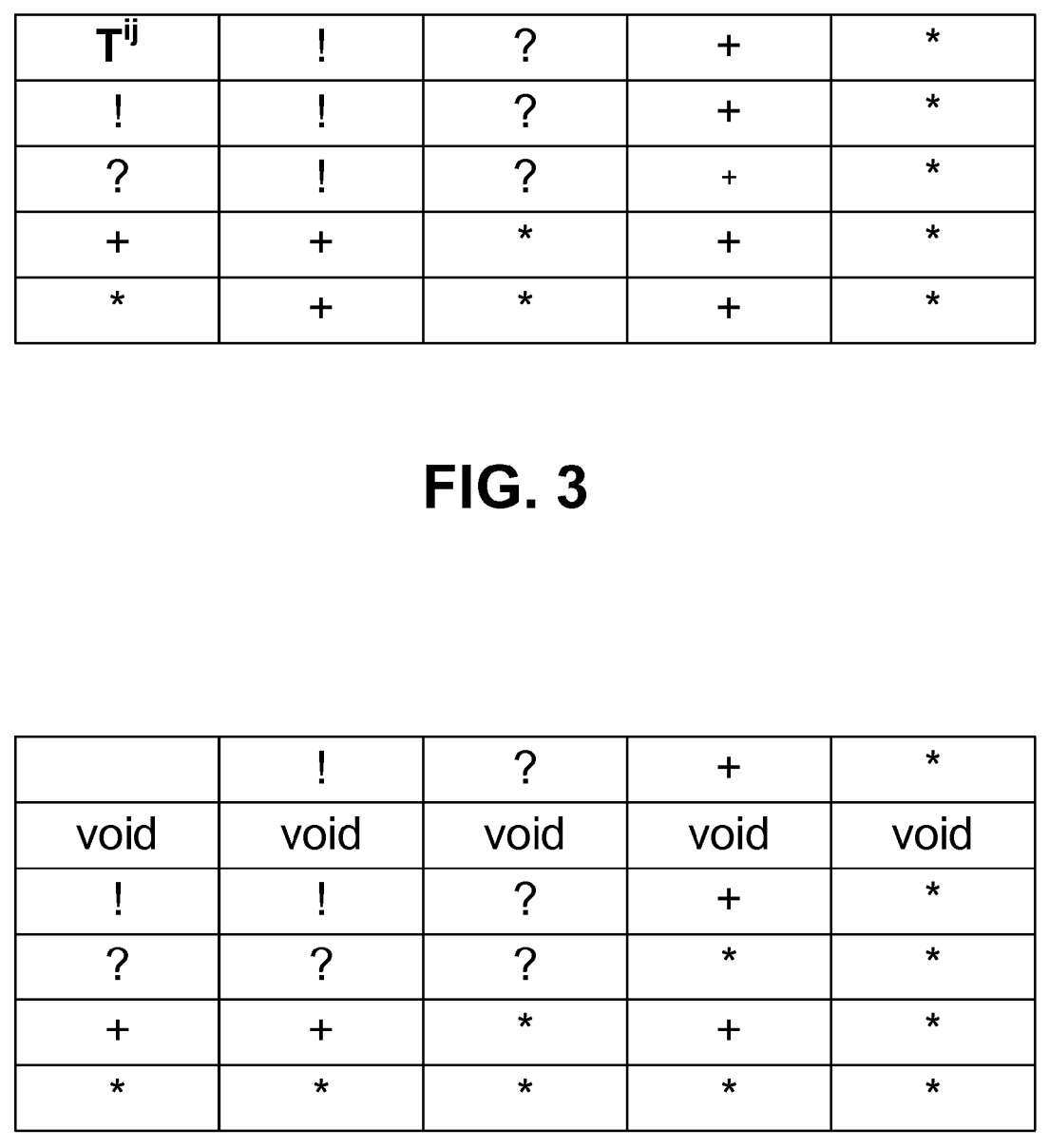

FIG. 4 illustrates a lifting member access table. When lifting member access over streams, the cardinality of the result stream can be determined by both streams. Here are a few examples that illustrate the rules for lifting. If we select all subject fields of a stream of messages, we get back a stream of (non-empty) strings:

```
Message* inbox = ...;
string* subjects = inbox.Header.Subject;
```

Although the AllowDrop member of Button has type bool and hence is never null, lifting AllowDrop over a possibly empty stream of type Buttons yields a possibly empty stream of booleans bool*:

```
Button* bs = null;
bool* a = bs.AllowDrop;
```

If we do know that the stream is never empty itself, then lifting member access that returns a non-null value returns a non-empty stream as well. However, if a value of the member can be null, then the result is a possibly empty stream.

```
Button+ bs = ...;
bool+ a = bs.AllowDrop;
string* s = bs.Text;
```

When the unlifted member access returns void, lifted member access also returns void. For example, we can bring all buttons in a stream to the front using one lifted method-call:
Button* bs= . . . ;
bs.BringToFront( );

B. Choice

Choice types 220, denoted S|T, and indicate that a type may be either S or T.

1. Subtyping Rules

| Upper Bound: | S <: S|T, T<: S|T |
| Least: | S <: R, T <: R |
| | ----------------- |
| | S|T <: R |
| Nonsense: | choice { }* <: T* |
| Idempotence: | S|S = S |
| Associativity: | R|(S|T) = (R|S)|T |
| Commutativity: | S|T =T|S |
| Depth-subtyping (covariance): | S <: T |
| | ------------ |
| | R|S <: R|T |

2. Introduction Rules

There is no explicit constructor for choice types; they are created by (implicitly) upcasting from S or T to (S|T) or by (explicitly) downcasting from a common supertype R of S and T to (S|T).

3. Elimination Rules

Choice types can be eliminated by downcasting from (S|T) to either S or T, or by upcasting from (S|T) to a common supertype R of S and T.

4. Lifting Member Access

In particular, member access m on S and T is lifted to (S|T) provided member-access on both S and T return a value of a common type R.

To understand how choice types are employed, consider the following example in which the USAddress type has a ZipCode member of type integer and City, Street, and Country members of type string.

```
USAddress a =
    <address>
        <Street>One Microsoft Way</Street>
        <City>Redmond<City>
        <ZipCode>98052</ZipCode>
        <Country>US</Country>
    </address>;
```

This raises an interesting question concerning what the result type of the query a.* that selects all the members of the instance a of type USAddress. Wild-card selection a.* is a shorthand for the generator expression.

({yield a.Street; yield a.City; yield a.ZipCode; yield a.Country;})

which yields the stream ["One Microsoft Way", "Redmond", 98090, "US"] whose elements are either of type string or of type integer. According to an aspect of the present invention, one can unambiguously express this using the choice type (string|int)*. The choice type int|string accurately captures the fact instances of int|string have exactly type int or string but nothing else. Only the types int and string are implicitly convertible to their choice string|int.

Typing query results are not the only use for choice types. They can also be employed to define content models where they serve the same role as choice elements in XSDs or "|" in DTDs. For example, a choice type can be employed to define a more flexible Address that allows either a Street or a POBox:

```
class Address {
    ( (string Street;)|(int POBox;);
        string City;
        int ZipCode;
        string Country;
    );
}
```

Using choice types in the source of member access also gives rise to an interesting question about the result type. Given an instance a of type Address, what should types of accessing a.POBox and a.Street be? Since an instance a of type Address can either contain a Street member of type string or a POBox member of type int, accessing a.Street will either return a string when a does contain a Street member, or null when a does not contain a Street member. Similarly, when a contains a POBox member, accessing a.POBox returns an int, and when a does not contain a POBox member, it returns null. Hence the return type of a.Street is string? and the return type of a.POBox is int?. Note that when we have a choice with different members of the same type, there is no way to determine from the result which alternative was actually present. For example, take the following class that models prices in either euros, US dollars, or Japanese yen:

```
class Price { (decimal Euro;)|(decimal USD;)|(decimal Yen;); }
Price p =<Price><Euro>9.99m</Euro></Price>;
```

Types of p.Euro, p.USD, and of p.Yen are all decimal?; and hence, there is no way we can tell the currency of a price after selecting p.*. In this case, it is better to define new type restrictions for Euro, USD, and Yen and use type-based selection:

```
new type Euro = decimal
new type USD = decimal
new type Yen = decimal
class Price { (Euro|USD|Yen); }
Price p =<Price><Euro>9.99m</Euro></Price>;
```

Now p.Euro has type Euro?, p.USD has type USD? and p.Yen has type Yen?, respectively and p.* has type Euro|USD|Yen.

Like stream types 210 choice types 220 are also subject to flattening and conversion rules. Furthermore it should be noted that since choice type S|T is defined as a least upperbound of S and T we get several nice structural equivalences for choice types:

- If there is an implicit conversion from one alternative type to another alternate type, then the former type can be dropped from the choice. As such, choice types are idempotent (e.g., string|string=string).
- Choice types are associative and commutative, that is, order and nesting do not matter, hence (int|string)|char=string|(int|char), which we can also write as int|string|char.
- Without choice types, the best approximation for int|string is object, and the best type we can give to Button|Label is Control. In both cases we are forced to throw away static type information, thus increasing a scope for bugs.
- If we know that a value of a choice type is not null, we know that both alternatives are not null. From this it follows that non-nullness distributes over choice; that is, the types (S|T)! and (S!|T!) are equivalent. Similarly, if we know that one of the alternatives of a choice type is possibly null, the value of the choice type itself is possibly null. From this, it follows that the types (S|T)? and (S?|T?) are equivalent. These two rules allow us to push the type constructors ! and ? into choice types and normalize choice types involving ! and ? in the form ( . . . |Ti| . . . ) where i is either ? or !.
- We cannot freely move the stream constructors * and +across choices, obviously the type int*|bool* (either a stream of integers, or a stream of booleans) is not the same as the type (int|bool)* (a stream of either integers or booleans). What does hold is that an outer * or + on a choice type absorbs any stream type inside that choice: ( . . . |Ti| . . . )j=( . . . |T| . . . )j where i is any stream type, and j is either + or a. Hence we can normalize choice types inside a stream into the form ( . . . |T| . . . )j where j is either * or +.

In certain pathological cases, converting to a choice type is problematic. When one alternative of the choice is a reference type and the other is a value type there are different applicable conversions. For instance:

```
struct Cell { int Value; }
new type PositiveCell = Cell requires Value > 0;
PositiveCell x = (PositiveCell)new Cell(13);
 (PositiveCell^|Cell) y = x;
PositiveCell z = (PositiveCell^)y;
z.Value = 4711;
if(y.Value == z.Value) Console.WriteLine("y was converted to
    PositiveCell^);
```

By utilizing aliasing, we can observe whether x has been converted to PositiveCell^ (a reference type) or to Cell (a value type). This is an example of incoherence, a very undesirable situation. The type system of the present invention has been carefully designed to be coherent and in order to guarantee coherence, when converting from a type S to a choice type T1|T2, the type-checker selects the better of the two possible conversions from S to T1 and from S to T2 according to standard overloading resolution rules. In the example above, however, there is no better conversion, and hence the assignment is flagged as a type-error.

C. Intersection

An intersection type 230, denoted S&T, is an anonymous type that denotes an instance that has both types S and T. The type S&T is the largest type that is both a subtype of S and of T. More formally, the type S&T is defined as a greatest lowerbound of S and T.

1. Subtyping Rules

| Lowerbound: | S&T <: S, S&T <: T |
| Greatest: | R <: S, R <: T |
| | R <: S&T |
| Distribution: | (S|T)&R <: (S&R) | (T&R) |
| Idempotence: | S&S = S |
| Associativity: | R&(S&T) = (R&S)&T |
| Commutativity: | S&T = T&S |
| Depth-subtyping (covariance): | S <: T |
| | R&S <: R&T |

Intersection types are transparent, that is, there is no value x that has intersection type S&T as its *dynamic* type. However, if x has static type S&T, then both upcasts (S)x and (T)x will succeed. Furthermore, as relations above show, Intersection and choice distribute over each other 2. Introduction Rules There is no explicit constructor for intersection types, they are created by (implicitly) upcasting from some type R that is but a subtype of S and T to (S&T) or by (explicitly) downcasting.

Intersection types are most useful for interfaces. For class types such as Button amp; String there exists no type R that is both a subtype of Button and String, and hence it will not create a value of Button amp; String except for null.

If the relation S&T is Ø holds, then the type S&T has no values (except null when both S and T are reference types):

| T&R is Ø |
| R <: S |
| T&S is Ø |
| not (N <: M or M <: N) |
| N&M is Ø |
| T&S is Ø |
| T!&S! is Ø |
| T&S is empty |
| T[ ] & S[ ] is Ø |
| T&S is Ø |
| [...,T[m],...] & [...,T[m],...] is Ø |

3. Elimination Rules

Intersection types can be mitigated by upcasting from (S&T) to either S or T, or by downcasting from (S&T) to a common subtype R of S and T.

There are many uses for intersection types. The following example shows how labeled records can be modeled with intersection types.

```
interface IA { int a( ); }
interface IB { bool b( ); }
class X: IA, IB {
    int a( ){ return 4711; }
    bool b( ){ return false; }
}
class Y: IB, IA {
    bool b( ){ return true; }
    int a( ){ return 13; }
}
IB&IA x = new X( );
IA&IB y = new Y( );
x = y;
```

Without intersection types, programmers are forced to introduce names for anonymous intersection types IA&IB and IB&IA, making assignment x=y impossible. In C#, method groups are expressible (they are returned by primary expressions), but not denotable (method groups cannot be assigned to variables). However, in accordance with an aspect of the present invention, method groups can naturally be mapped to an intersection of closures, a generalization of anonymous delegates.

```
class A {
    void m (int x){...}
    bool m (string s){...}
}
A a = new A( );
void(int)&bool(string) m = a.m;
m("Hello World!");
```

In the above example, the variable m of type void(int) &bool(string) would be bound to the method group comprising closures (using pseudo ILAsm syntax) that capture receiver a:

```
(int x){ a.'void A::m(int)'(x) }
(string s){ a.'bool A::m(string)'(s) }
```

D. Sequence

A sequence 240 is a list of ordered elements. The value type [ . . . , T[m], . . . ] models sequences (e.g., records, tuples) with optionally labeled fields. This implies that sequences are copied on assignment and on casting.

Non-nullness for sequences is treated specially and means that when upcast to a stream, the resulting stream is not-empty. Thus, sequence instance [null] is considered to be empty, eventhough the sequence itself is not null. However, when cast to T*, the resulting stream will be empty.

1. Subtyping Rules (Using Informal Notation)

```
Associativity:
    Sequence{ ...; sequence{ ...}; ...} =
sequence{...;...;... }
Neutral:
    sequence{...; sequence{ }; ...} = sequence{...;...}
Covariance:
    sequence{...;S[m];...}<:
sequence{...;T[m];...}provided S<:T
Label Dropping:
    sequence {...;S m;...} <: sequence {...;S;...}
Stream:
    sequence{...;S m;...} <: choice{...;S;...}*
```

```
Distributivity:
    choice{sequence{...;S [m]; Y}; sequence{...;
T [m[;
...]}}
    =
    sequence{...; choice{S [m]; T [m]};...}
    =
    sequence {X; choice{S;T} [m]; Y}
```

2. Introduction Rules

The introduction rule for sequence state that a programmer can create an instance of a sequence using sequence ( . . . ) constructor.

3. Elimination Rules

Sequence types can be eliminated by upcasting to choice { }*, indexing via label, indexing via position, or indexing via type.

4. Assignment Rules

The rules for sequence{ } assignments are indexing via label (if exactly filled with that label) or indexing via label and position. In addition, assignment requires a dynamic type check to ensure type safety.

E. Invariant

In type-systems that support subtyping, a rule of subsumption states that instances of a subtype can be substituted for instances of a supertype, or more formally, if e has type S and type S is convertible to T, then e also has type T. Under a pure subsumption rule, there is no way to prevent substitution of an instance of a supertype by an instance of a subtype. The present invention introduces a new structural type, invariant type 250 denoted T° that is not subject to subsumption. In other words, an instance of type T° is only substitutable by an instance of exactly type T.

The invariant type T° denotes values whose dynamic type is substantially the same as their static type. Invariant types are transparent, that is, there are no values with dynamic type T°. Invariant types T° can be introduced by explicit downcasting from type T. Object constructors for a type T return values of type T°. Additionally, it is possible to upcast an invariant type to a normal type as follows: T°<: T!. Moreover, invariant types are, as the name suggests, invariant, therefore it is not the case that:

$$\frac{S <: T}{S° <: T°}$$

Invariant types may be useful in many practical situations, such as document processing and dealing with covariant types such as arrays, where it is desirable to prevent or block the substitutability of instances. For example, given the following two classes,

```
class Foo{
    Virtual int foo( ){ return 4711;}
}
class Bar : Foo{
    override int foo( ){ return 13;}
}
``` it is possible to assign an instance of class Bar to a variable of static type Foo.

```
Foo f = new Bar( );      //cannot prevent this assignment
Int x = f.foo( );
```

Since method dispatch is based on the dynamic type of instances, the call f.foo( ) will invoke the foo method class Bar and return 13 instead of 4711. In current languages/type systems there is no way to prevent the assignment of an instance of type Bar to a variable of type Foo.

The new invariant type 250, however, does allow programmers to block substitutability of type Foo by subtypes. For example:

```
Foo° f = new Bar( );     //type-error, Bar is not substitutable for Foo°
Foo° f = new Foo( );     //OK, only Foo is substitutable for Foo°
Object a = f;            //OK, Foo° is substitutable for any supertype of Foo
```

II. Type Restrictions

In many applications, programmers want to create a new type that restricts the range of values of some base type to a subset of those values according to some predicate. For instance, a new type of small strings whose length is at most 32 characters. It is important that programmers be able to specify precise types for the objects they want to manipulate, especially when dealing with data intensive programming tasks. In accordance with an aspect of the present invention, two methods of restricting a range of types are disclosed.

Figure 5A:
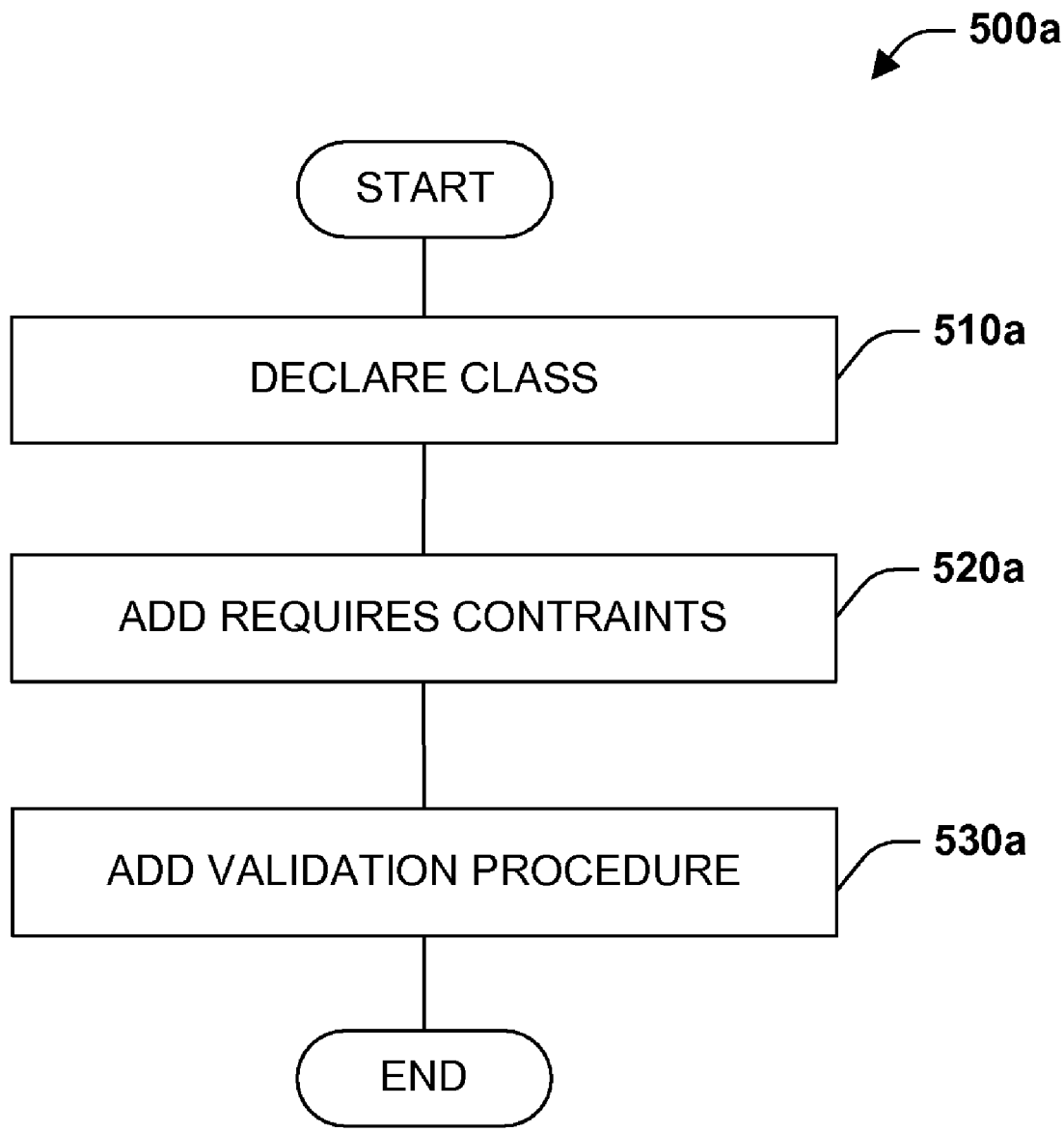
FIG. 5a is a flow diagram depicting a method of restricting a type in accordance with an aspect of the present invention.

Turning to FIG. 5a, a method for restricting a type 500a is depicted. First, at 510a, a class is declared. At 520a, a require constraint(s) is declared within a class via a keyword "requires" and a predicate, which states conditions for valid values of the declared type. Then, at 530a, a validate procedure is specified via a keyword "validate" that includes code that will bring a value of the restricted type into a valid state. The following is abstract syntax for restricting a type via a class definition:

class N: M { . . . } [requires P] [validate S]

Figure 5B:
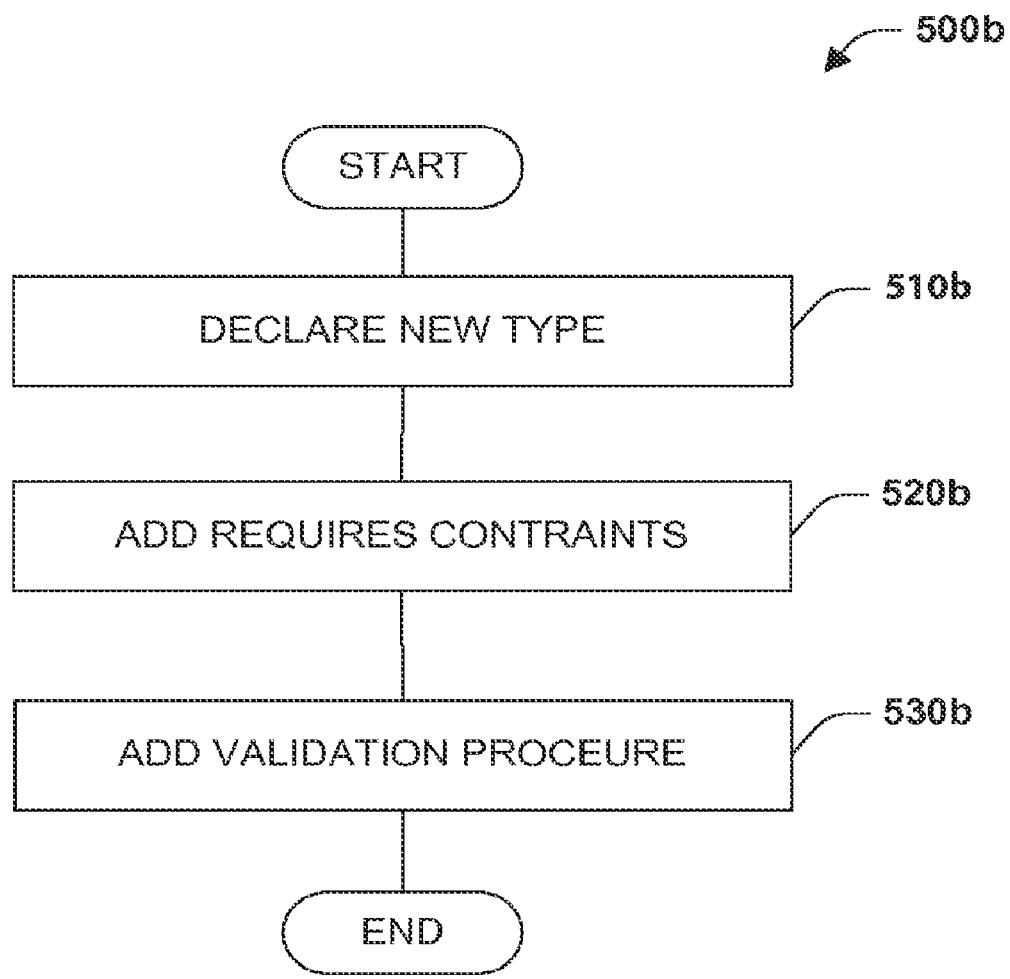
FIG. 5b is a flow diagram illustrating an alternate method of restricting a type in accordance with an aspect of the present invention.

FIG. 5b depicts an alternative method 500b for restricting a type. At 510b, a new type is declared. Next, at 520b, required constraint(s) are declared by using the "requires" keyword and a predicate. At 530b, a validation procedure is added to bring a value of the restricted type into a valid state. Restricting types in this manner corresponds to applying a restriction on an existing type. The following is abstract syntax for restricting type values in accordance with this procedure:

newtype S=T [requires P] [validate S]

The predicate P, in both methods, can be checked upon casting to N and assignment to variables of static type N, while the statement S can be used to bring an instance of S or T, or N into a consistent state (e.g., in a state such that predicate P is valid).

The following is an example of a use of type restrictions. The example employs a closure of type digit*(int) that generates digits of a given integer by recursively yielding a remainder of dividing the number by 10:

```
digit* Digits(int n){
    if(n!=0) {
    yield Digits((digit)n/10); yield (n%10);
        }
    };
```

The return type digit restricts values of type int to digits between 0 and 9:

```
new type digit = int requires IsDigit(value);
    bool IsDigit(int n){ return n >= 0 && n <= 9; };
```

A new type digit is implicitly convertible to its base type int (so we have effectively created a subtype of the value type int), but an explicit cast is needed to convert an int to a digit. This explicit conversion throws an InvalidCastException when a value is not within a required range.

In XSD-lingo, the above example would correspond to restricting a simple type.

```
<simpleType name="digit">
    <restriction base="integer">
        <minInclusive value="0"/><maxInclusive value="9"/>
    </restriction>
</simpleType>
```

A novel distinction is that, in accordance with the present invention, authors can use any predicate to restrict a range of values, whereas in XSD schemas one is limited to using a set of pre-existing facets. Additionally, according to the present invention, a mechanism for defining a new restricted type uniformly works for any type.

The following example first defines a general type Address and a derived type USAddress by restricting the Country member to the string "US".

```
class Address {
    ( string Street;
      string City;
      int ZipCode;
      readonly string Country;
    );
}
``` new type USAddress=Address requires value.Country=="US"

As can be observed below, the same example using XSD schemas again is needlessly verbose and repetitive.

```
<complexType name="Address">
    <sequence>
        <element name="Street" type="string"/>
        <element name="City" type="string"/>
        <element name="ZipCode" type="integer"/>
        <element name="Country" type="string"/>
    </sequence>
</complexType>
<complexType name="USAddress">
    <complexContent>
        <restriction base="Address">
            <sequence>
                <element name="Street" type="string"/>
                <element name="City" type="string"/>
                <element name="Zipcode" type="integer"/>
                <element name="Country" type="string" fixed="US" />
            </sequence>
        </restriction>
    </complexContent>
```

III. Structural Delegates

Delegates are widely utilized to deal with events and asynchronous programming.

Therefore, it is important that a delegate creation process be as flexible as possible. Conventionally, a function is created containing a series of executable steps and a delegate is declared to reference the function. For example:

```
delegate void MouseEventHandler(object sender, MouseEventArgs e);
Button b = new Button( );
b.MouseDown += new MouseEventHandler(this.OnMouseDown);
void OnMouseDown(object sender, MouseEventArgs args){
    MessageBox.Show("Hello World");
}
```

However, a lighter syntax for creating function closures can be employed together with a set of type rules that describe a translation and conversion of expressions into anonymous delegates. Formally, an abstract syntax for structural delegates, in accordance with an aspect of the present invention, is defined as a method declaration without a return type and method name:

E::=([FormalParameterList]){S}
T::=delegate T( . . . , T, . . . )

Typing rules for a structural delegate construction expression utilize an underlying concept of anonymous delegates to construct a wrapper delegate that bridges an impedance mismatch between a signature of a created delegate and expected delegate types. Denoted formally as follows:

```
Delegate B D (..,A a,...)
A <: A'~~>f
B' <: B ~~>g
S returns B'~~S'
-----------------------------------------------
(...,A' a',...){ S} <: D~~>h
where h = new D(a){
            delegate B' D'(A' a);
            return g(new D'(a'){S'}(f(a)));
        }
```

Therefore, with respect to the conventional example above, a functional closure can be rewritten as follows:

```
b.MouseDown += (object sender, EventArgs args){
                    MessageBox.Show("An event has occurred");
                    Return true;
                }
```

Figure 6:
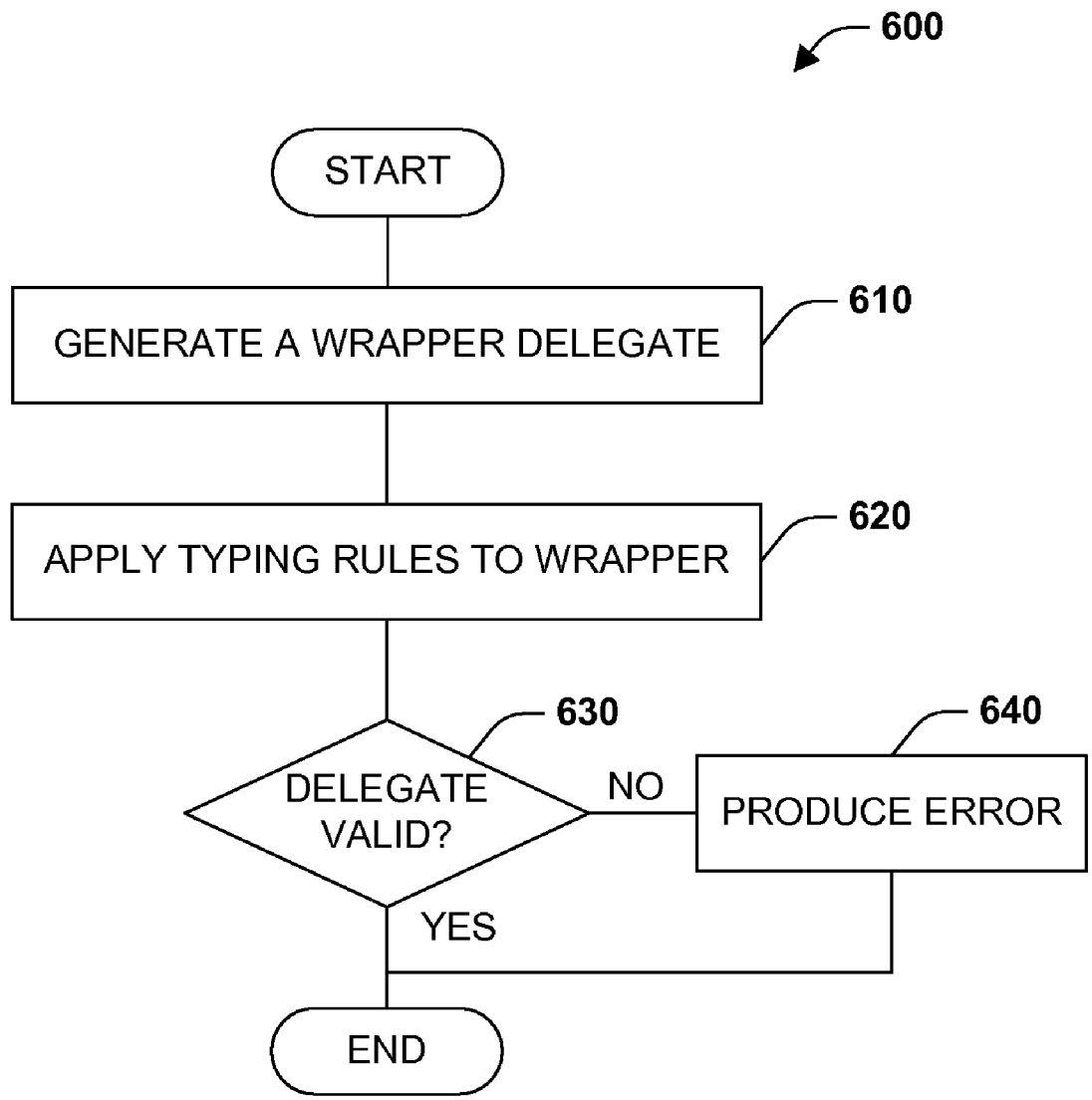
FIG. 6 is a flow diagram depicting a method of type checking a structural delegate in accordance with an aspect of the present invention.

Turning to FIG. 6, a method 600 for type checking a structural delegate is illustrated. First, at 610, a wrapper delegate is produced by a type-checker 130 by upcasting arguments and results of an inner delegate. For instance, with respect to the above structural delegate b.MouseDown, the following wrapper will be produced:

```
b.MouseDown += new
MouseEventHandler(/*object*/sender,/*MouseEventArgs*/ args){
            delegate bool XYZ (object sender, EventArgs
args);
            XYZ temp = new XYZ(sender, args){
                messageBox.Show("An event has occurred");
                return true;
```

```
            };
            bool b = temp(sender,(EventArgs)args);
            return;
        };
```

This method can thereby convert structural delegates into nominal type delegates. At, 620 delegate type rules supra, are applied to a produced wrapper. At 630, a determination is made as to whether the produced wrapper satisfies the type rules. If yes, the process terminates with out error. Otherwise, an error is produced at 640, and then the process terminates.

IV. Strict Statically Checked Interface Casts

Interfaces are constructs that encapsulate class data and provide a signature for client code. In some object-oriented languages casting from a value e of static type S to an interface IA generally does not cause a compile-time error to anticipate the fact that a dynamic type of e might implement IA.

Consider the following classes and casts:

```
interface IA {...}
class S {...}
class T : S, IA{...}
class R : S {...}
S s1 = new T( );
IA a1 = (IA)s1;
```

In the above case, the static type of s1 is S while the dynamic type is T. Thus, the cast from s1 to IA succeeds at compile time and at runtime. However, consider the following assignment and cast on the same class:

```
S s2 = new R( );        //static type of s2 is S, dynamic type is R
IA a2 = (IA)s2;         //succeeds at compile time, fails at runtime
```

Here, the static type of s2 is S, while the dynamic type is R. In this scenario, the cast will succeed at runtime, yet fail at runtime because R does not implement IA.

Currently, only when it is statistically provable that e can never implement IA, for instance, when class S is final, will casting from S to IA cause a compile time error.

```
Sealed class S {...}
U u = new U( );
IA a3 = (IA)u;    //fails at compile time, dynamic type U cannot be
                  //subtype
```

The downside of this conservative approach is that when programmers make heavy use of interfaces, there will be less static checking (as shown above in the assignment IA a2= (IA)s2). Moreover, utilization of explicit interfaces is also syntactically rather heavy in weight.

Figure 7:
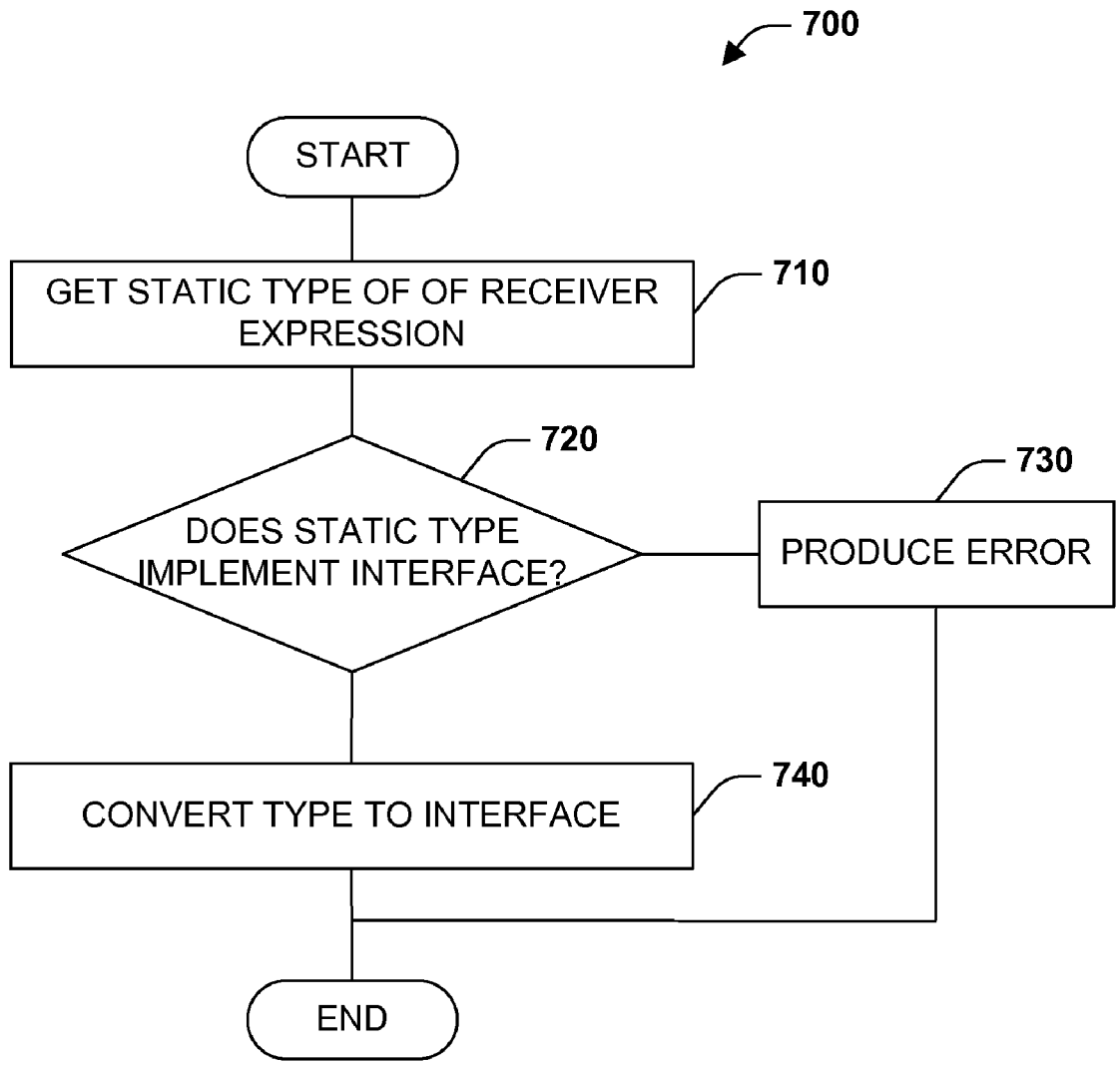
FIG. 7 is a flow diagram of illustrating a method of type checking a type cast to interface in accordance with an aspect of the present invention.

Turning to FIG. 7, a method 700 for statically checking interface casts is depicted. At 710, a static type of a receiver expression is retrieved. At 720, a check is made to determine whether the static type of the expression implements an interface. If no, then a compile time error is produced at 730; and the methodology terminates. However, if the static type implements the interface, then a type-checker converts the type to the interface at 740. For example, an invocation (or member access) expression of the form e. IA.f( . . . , ai . . . );
will result in a compile type error if a static (compile time) type R of the receiver expression e does not implement interface IA. If type R does implement interface IA, the typechecker inserts a conversion from R to IA, that is, in that case the expression e.IA;;f(f . . . , ai, . . . ) is equivalent to the expression ((IA)e).f( . . . , ai, . . . ).

The formal syntax and type rules are expressed below:
E::=E.identifier::identifier(E, . . . , E)

The typing rule below expresses a condition that invocation e.S::n( . . . , ai, . . . ) is well-typed and has static type T, if type R of the receiver expression e is convertible to S via conversion function f, and types Ai of actual arguments ai, match expected argument types of the member n of type S.

$$E <: R \rightsquigarrow e', R <: S \rightsquigarrow f$$
$$Ai <: Ai \rightsquigarrow ai'$$
$$S\text{¤child}::n <: T(..., Ai,...) \rightsquigarrow g$$
$$\overline{\rule{6cm}{0.4pt}}$$
$$e.S::n(...,ai,...) <: T \rightsquigarrow g(f(e'),...,ai,...)$$

Figure 8:
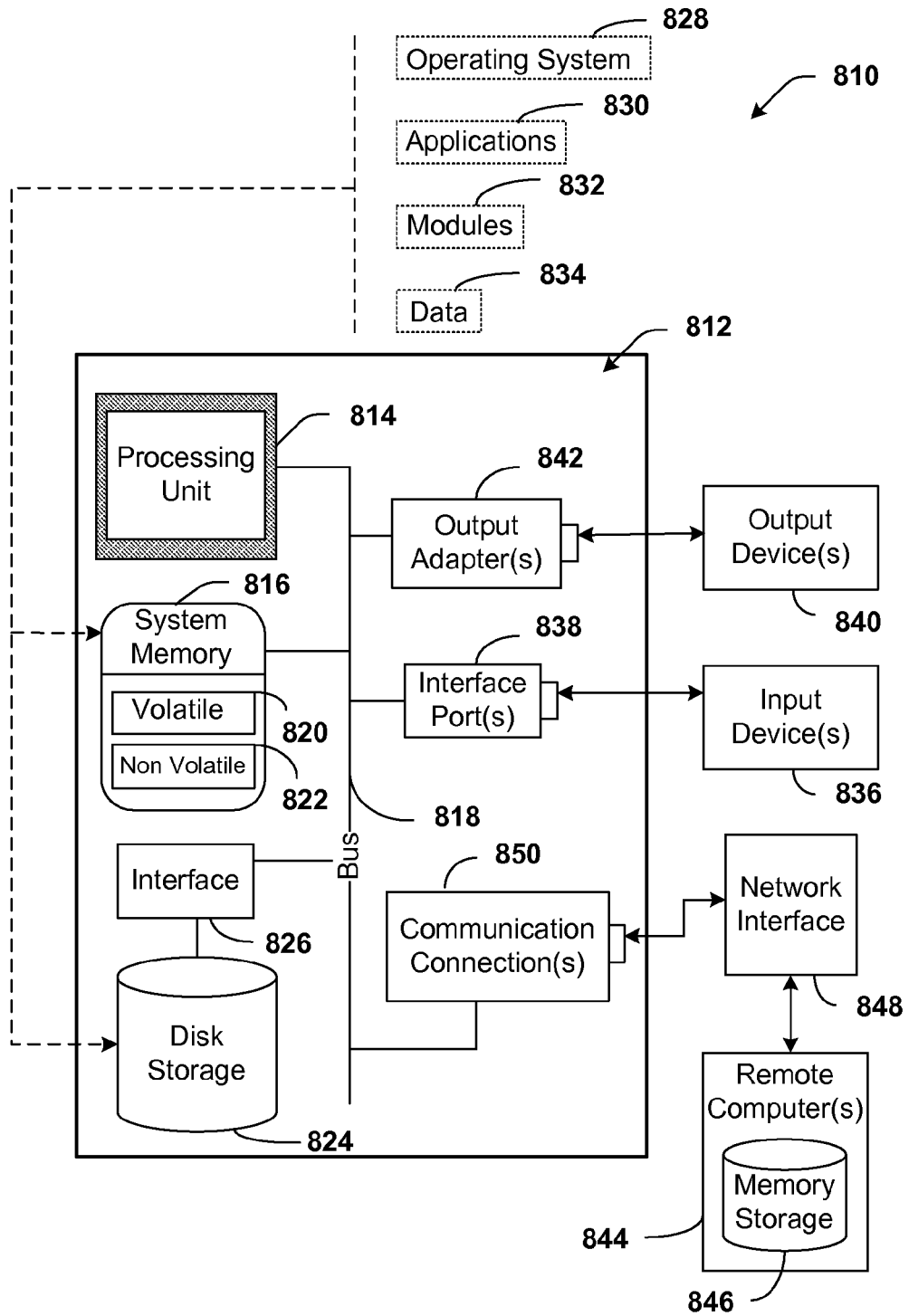
FIG. 8 is a schematic block diagram illustrating a suitable operating environment in accordance with an aspect of the present invention.
Figure 9:
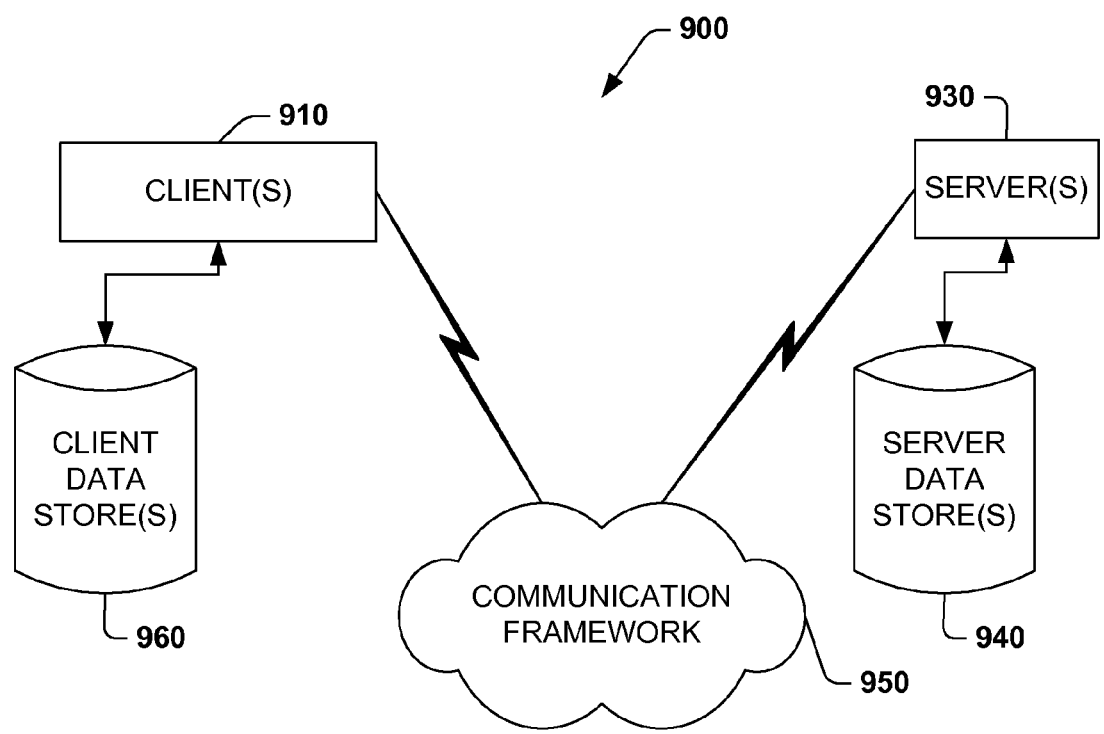
FIG. 9 is a schematic block diagram of a sample-computing environment with which the present invention can interact.

In order to provide a context for the various aspects of the invention, FIGS. 8 and 9 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practices on stand alone computers. In a distributed computing environment, program modules may be locate in both local and remote memory storage devices.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 4134 stored either in system memory 816 or on disk storage 824. It is also to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method for restricting type values by declaring a restricted type that is a restriction of a base type via a class definition, the restricted type restricting a range of values available to the base type to a subset of the range of values, the method comprising:
   at a computer system, which includes one or more processors, declaring a class that defines a restricted type that is a restriction of a base type; and
   at the computer system, defining one or more restricted type values for the restricted type, comprising:
      adding one or more constraints to the class via a predicate that states one or more conditions for validating the one or more restricted type values, the one or more conditions restricting available values of the base type to a subset of the available values; and
      adding a validate procedure to the class that, when called, executes code that changes at least one of the one or more restricted type values into a valid state for the restricted type, the valid state meeting the one or more stated conditions of the predicate.

2. The method of claim 1, wherein the one or more constraints are declared within the class via a requires keyword.

3. A computer-implemented method for declaring a restricted type that restricts a range of type values available to a base type to a subset of the range of values, the method comprising:
   at a computer system, which includes one or more processors, declaring a new type that corresponds to a restricted type that is a restriction of a base type;
   at the computer system, adding one or more required constraints to the new type via a predicate that states one or more conditions for validating one or more restricted type values, the one or more conditions restricting a range of values of the base type to a subset of the range of values; and
   at the computer system, adding a validate procedure that, when called, executes code that brings at least one of the one or more restricted type values into a valid state for the new type, the valid state meeting the one or more stated conditions of the predicate.

4. The method of claim 3, wherein the one or more required constraints are declared within the type via a 'requires' keyword.

5. The method of claim 3, wherein the restricted type is implicitly convertible to the base type from which the restricted type is derived.

6. The method of claim 5, wherein an explicit cast is required to convert the base type to the restricted type.

7. The method of claim 6, wherein an error is generated during the explicit conversion when a given value is not within the subset of the range of values as specified in the predicate.

8. The method of claim 3, wherein the predicate calls the validate procedure.

9. The method of claim 3, wherein the validate procedure is called during an explicit cast from the base type to the new type.

10. The method of claim 3, wherein the validate procedure throws an exception when the validate procedure fails to bring the at least one value into the valid state for the new type.

11. The method of claim 10, wherein the validate procedure throws the exception when the validate procedure fails to brings the at least one value into the subset of the range of values.

12. The method of claim 3, wherein the new type comprises one or more of a choice type, an intersection type, a sequence type, or an invariant type.

13. The method of claim 3, wherein the validate procedure brings the at least one value into the subset of the range of values.

14. A type system for restricting type values, comprising:
one or more processors; and
one or more computer storage media having stored thereon computer-executable instructions that, when executed, implement a method for declaring a restricted type that restricts a range of type values available to a base type to a subset of the range of values, the method comprising:
providing at least a new type that corresponds to a restricted type that is a restriction of a base type and that restricts a range of values associated with the base type to a subset of values associated with the new type;
providing one or more required constraints for the new type and a predicate that states one or more conditions for valid values of the new type, the one or more conditions restricting valid values of the new type to the subset of values; and
providing a validate procedure that, when called, executes code that applies the one or more required constraints by bringing at least one value into a valid state for the new type.

15. The system of claim 14, wherein the new type is implicitly converted to the corresponding base type from which the new type is derived.

16. The system of claim 14, wherein an explicit cast converts the base type to the new type.

17. The system of claim 14, further comprising providing a type checker that generates an error during the explicit conversion when a given value is not within the subset of values as specified in the predicate.

18. The system of claim 14, wherein the new type is a stream comprising a lazy list of values and the required constraints confine the values associated with the stream type to a defined range.

19. The system of claim 18, wherein the stream type comprises one of zero elements or finite number of elements or infinite number of elements.

20. The system of claim 19, further comprising a generator that creates the elements of the stream type.

* * * * *

UNITED STATES PATENT AND TRADEMARK OFFICE
CERTIFICATE OF CORRECTION

PATENT NO.        : 8,112,740 B2
APPLICATION NO.   : 12/139693
DATED             : February 7, 2012
INVENTOR(S)       : Erik Meijer et al.

Page 1 of 1

It is certified that error appears in the above-identified patent and that said Letters Patent is hereby corrected as shown below:

In column 4, line 51, delete "<M>t</M>validates as N~~>f(')" and insert
-- <M>t</M> validates as N --> f(t') --, therefor.

In column 7, line 23, delete "[m, T m]." and insert -- [S m, T m]. --, therefor.

Signed and Sealed this
Twenty-seventh Day of March, 2012

David J. Kappos
*Director of the United States Patent and Trademark Office*